Jan. 19, 1971  V. R. BERG, SR., ETAL  3,556,605
STACKER
Filed July 15, 1969  2 Sheets-Sheet 1
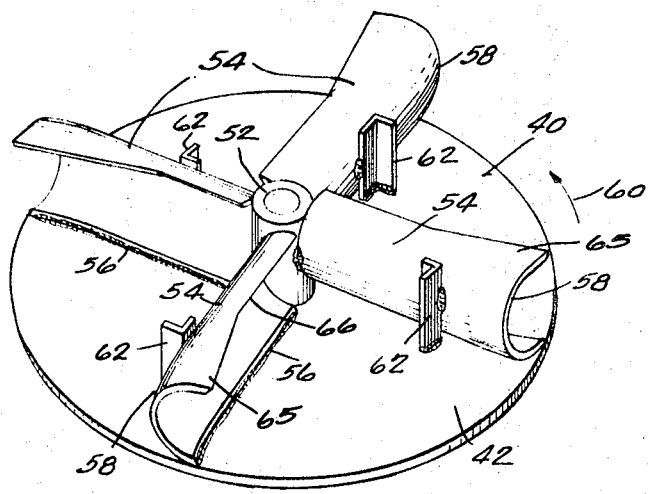
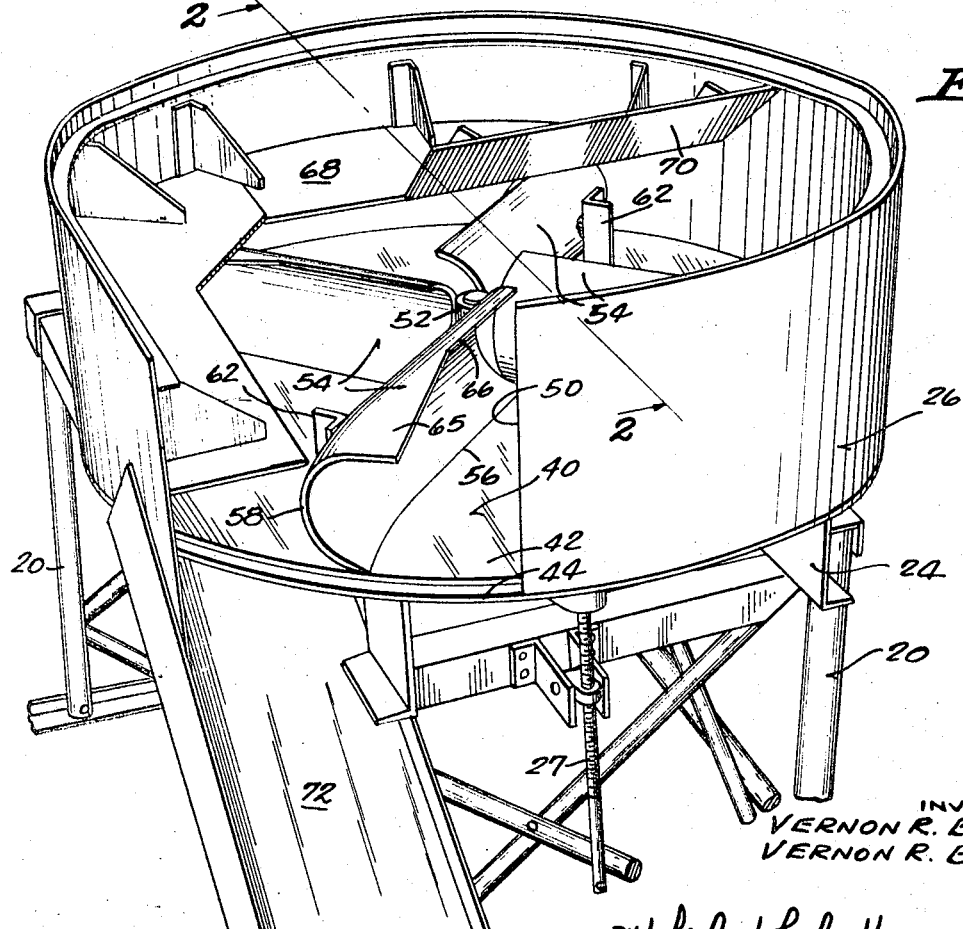
INVENTORS
VERNON R. BERG, SR.
VERNON R. BERG, JR.
BY Wheeler, Wheeler, House & Clemency
ATTORNEYS Jan. 19, 1971     V. R. BERG, SR., ETAL     3,556,605
STACKER
Filed July 15, 1969     2 Sheets-Sheet 2
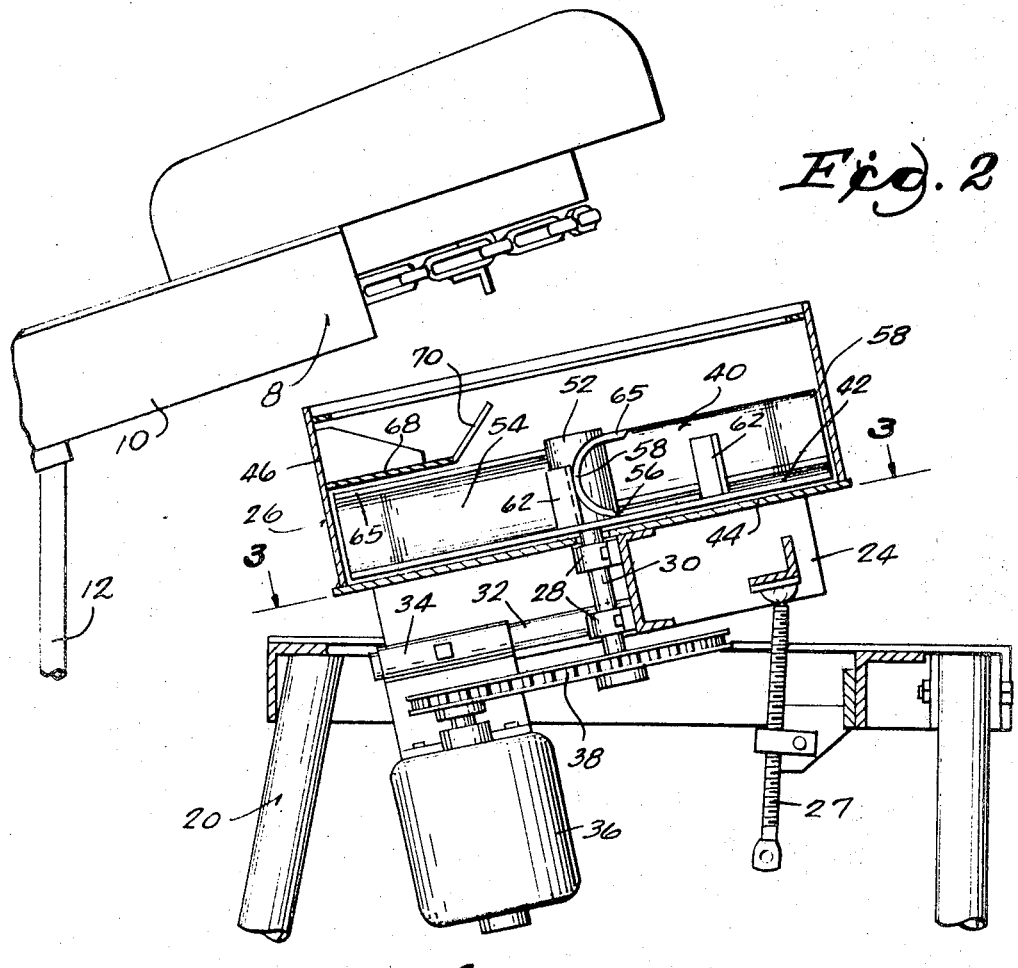
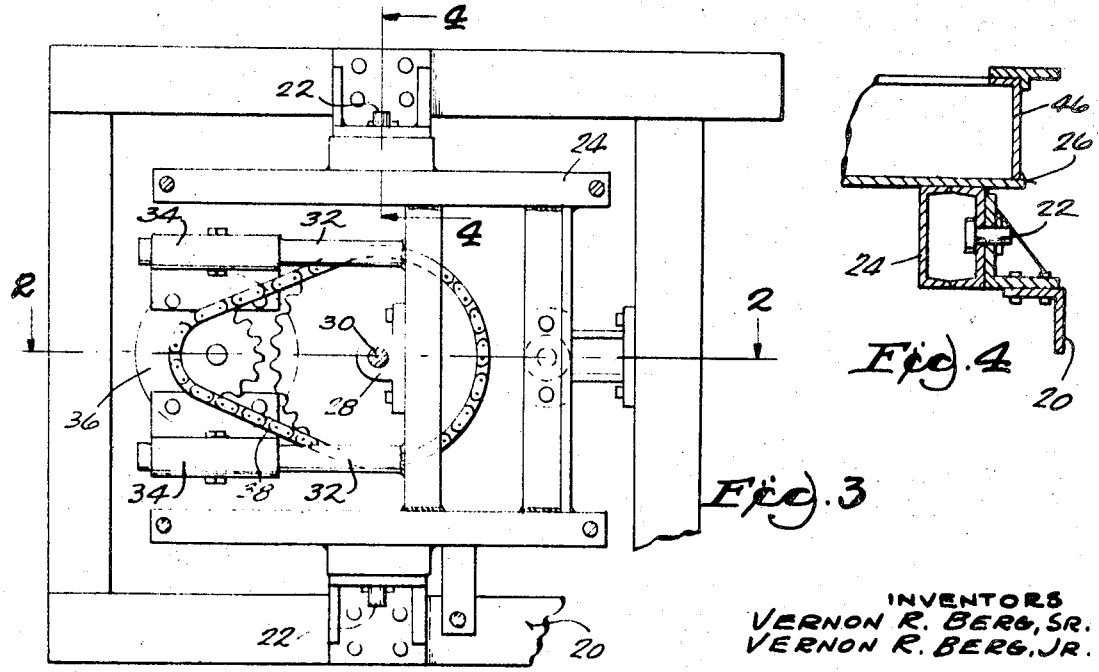
INVENTORS
VERNON R. BERG, SR.
VERNON R. BERG, JR.
BY Wheeler, Wheeler, House & Clemency
ATTORNEYS

United States Patent Office 3,556,605
Patented Jan. 19, 1971

3,556,605
STACKER
Vernon R. Berg, Sr., 1107 W. 8th St., and Vernon R. Berg, Jr., 413 W. Park St., both of Marshfield, Wis. 54449
Continuation-in-part of application Ser. No. 749,219, July 31, 1968. This application July 15, 1969, Ser. No. 841,915
Int. Cl. B65g 53/04
U.S. Cl. 302—37
9 Claims

ABSTRACT OF THE DISCLOSURE

A stand carries a motor-driven centrifugal and pneumatic throwing device in which generally radial blades forwardly pitched at their ends are of concave cross section in a vertical plane and are fixed on edge to a disk which fills the bottom of a housing. The housing is open at its top to receive the material to be stacked and it has an opening for tangential discharge. A baffle converging toward the plane of the rotor blades compresses air set in motion by such blades, the air contributing to the speed of discharge of the material. The housing is adjustable for controlling the elevation of the discharge.

---

The present application is a continuation in part of our application Ser. No. 749,219, filed July 31, 1968, now abandoned and entitled "Stacker."

BACKGROUND OF INVENTION

The stacker was initially designed to handle manure but has been found useful for many other farm and industrial products.

As applied to manure, there are certain areas in the United States and Canada where the manure cannot be spread on the fields during the wintertime and must be stacked until the snow melts. When there are large quantities of manure, the stack may be so large that it must be located at a considerable distance from the barn. Extension conveyors are expensive. The need therefor is eliminated by the present device, which will throw the manure to a stack at a considerable distance.

For handling such items as silage, straw, sawdust, bran chips, steel filings, shavings, punch-outs and other small scrap, the stacker is also a desirable piece of equipment because it enables the building of a stack remote from the point to which delivery of the material is made by other apparatus. It may also be used on chopped fresh pea vines or alfalfa or the like for such periods as the syrupy juice does not cause problems.

SUMMARY OF THE INVENTION

A base unit provides bearings for a driving motor and driving connection to the centrifugal throwing device. A housing with tangential outlet is open at its top to receive the material to be thrown by the blades. It may be titlable as to angle for controlling the trajectory. The horizontal direction of discharge is most easily controlled by bodily shifting the entire unit instead of merely rotating the housing on the base.

The impeller in the housing comprises blades arcuate in cross section and connected at their lower margins with a rotatable disk upon which they are mounted, this being desirable in handling material like manure to assure that the liquids will be discharged along with the solids and the straw component. The entire mass of material tends to be air-borne for a greater distance as a result of this arrangement.

The extreme ends of the blades preferably are curved and have flanges extending forwardly in the direction of rotation. Too litle curve allows too much drag of the material against the wall of the housing. Too great a curve tends to throw the material across the tangential outlet through which it should be ejected. The precise forward curve will desirably vary for different products. The housing is desirably materially deeper than the overall height of the rotor. Projecting inwardly from at least a portion of the housing wall immediately above the path of the rotor is a partial enclosure equipped with an inclined baffle at the point where the successive blades pass beneath the enclosure. This enables air to be trapped and compressed within the enclosure for discharge with the material to increase the velocity and distance of projection of the material as it issues from the tangential outlet.

BRIEF DESCRIPTION OF DRAWINGS

FIG. 1 is a view in perspective fragmentarily illustrating a stacker embodying the invention.

FIG. 2 is a detail view taken in section on the line 2—2 of FIG. 1.

FIG. 3 is a view taken in section on the line 3—3 of FIG. 2 and showing the driving and mounting mechanism with the housing removed.

FIG. 4 is an enlarged detail view taken in section on the line 4—4 of FIG. 3.

FIG. 5 is a detail view in perspective of the rotor disk and attached throwing blades.

DETAILED DESCRIPTION

The delivery end of a conveyor is shown at 8. For purposes of this application, this conveyor represents one conventional way of supplying material to the stacker. While the stacker will handle various materials, the conveyor shown is a conventional barn cleaning conveyor trough 10 supported by legs 12.

The stacker is arranged beneath the end of trough 10 to receive the material. It comprises a stand 20 provided at opposite sides with aligned trunnion pins 22 for the pivotal support of the base 24 for the housing 26. The screw 27 controls the tilted position of the base and housing with respect to the stand, thereby controlling the trajectory of the material discharged by the impeller. The tiltable base comprises bearing means 28 for the impeller shaft 30. Arms 32 support the adjustable sleeve 34 from which the driving motor 36 is supported. Chain 38 is a typical motion-transmitting means which connects the motor with the shaft 30.

The impeller 40, mounted on shaft 30 in housing 26, comprises a bottom disk 42 substantially co-extensive with the bottom wall 44 of the housing 26. The periphery of the disk is therefore in close proximity to the generally circular wall 46 of the housing. This wall may have a generally tangential delivery chute 48 or it may merely have an opening 50 placed for tangential delivery as shown in the construction of FIG. 1. Manure and silage and other farm material to be stacked frequently include substantial quantities of liquids. Almost all of these are caught on the rotating disk and discharged, whereby the bottom wall 44 of the housing is kept relatively clean.

Extending substantially radially from the central hub 52 are the impeller blades 54 which are included or otherwise connected along their lower margins to the disk 42 and desirably have the channel form best shown in FIG. 5, being arcuate in cross section or at least curved upwardly along their lower margins 56. Thus, as they pick up the material from the disk 42, they will tend to elevate such material (including the liquid components) for centrifugal ejection from the housing. The blades have compound curve. At their outer ends 58, the respective blades are desirably scooped or curved forwardly in the direction of rotation of the impeller. As shown in FIG. 1 and FIG. 5, the particular impeller illustrated is designed to rotate counterclockwise in the direction of the arrows 60. In the absence of such forward scooping of the ends of the blades, centrifugal force will cause the material to develop excessive friction against the wall of the housing. On the other hand, if the scoping is excessive, the material will tend to be carried across the delivery port 50 to recirculate around the housing instead of being ejected. Although the several blades are welded to the disk their lower margins 56, they are also desirably supported by means such as the welded angles 62.

As clearly appears in FIG. 1 and FIG. 5, the blades are not merely channeled but have flanges 65 projecting forwardly from the outer end of their upper margins 66.

The housing 26 is desirably much greater in depth than the vertical height of the rotor and its blades. Within the housing, and immediately above the path of rotation of the blades 54, there is a partial enclosure 68 beneath which air set in motion by the rotor is trapped and compressed. Because the air immediately above the rotor is also set in motion by the blades, the partial enclosure 68 is marginally provided with a baffle 70 for guiding the air above the rotor into the space below the partial enclosure 68 where it is compressed measurably by the advancing blades to facilitate the ejection of the propelled material. It is particularly effective in pneumatically conveying liquids to the stack to which the solids are directed.

Any material which does not become air-borne as a result of centrifugal delivery of material and air from the ends 58 of the impeller blades 54 will be picked up by a trough 72 which leads to the ground.

In practice, the impeller draws substantial quantities of air into the top of the housing along with the material which is to be stacked. Such air is ejected by the impeller blades with the material and serves to provide convection support for the material discharged from the housing. In a particular embodiment of thirty inch diameter, it has been found that the most advantageous speed of operation of the impeller is around four hundred r.p.m., plus or minus ten. The particular device in which this speed was found desirable used a seven and one-half to a ten horsepower motor for operating the impeller. Using such a device to stack manure, the manure was thrown for a distance up to forty feet.

We claim:

1. A material stacker comprising a housing having a substantially open top through which the material to be stacked is admitted with convection air, said housing having a side wall with a substantially tangential discharge opening, a motor-driven impeller rotatable in the housing in a direction to discharge material and convection air through said opening, means for the adjustable support of the housing, and means for rotating said impeller at a speed to hurl said material through said opening and into space, the impeller comprising channel-shaped blades radiating from a central drive shaft with which the housing is provided, said blades having forwardly directed margins increasing in circumferential extent toward the end of the respective blades.

2. A stacker according to claim 1 in which the impeller comprises a disk substantially corresponding in diameter to the housing within said wall and having blades secured marginally to the disk and disposed approximately radially thereon.

3. A stacker according to claim 1 in which the housing is provided with a central drive shaft for said impeller, the impeller comprising channel-shaped blades radiating from the drive shaft and the housing having a partial enclosure overhanging the impeller and beneath which the ends of the respective blades move as they approach the discharge outlet in rotation with said shaft, said partial enclosure being at a level intermediate the height of the housing and closely adjacent the path of rotation of the blades.

4. A stacker according to claim 3 in which said partial enclosure has a baffle having an elevated free margin and which is downwardly inclined from said margin toward the level of the partial enclosure and connected with said enclosure where the ends of the blades pass beneath said partial enclosure, said baffle being adapted to direct beneath the partial enclosure air which is set in motion above the impeller.

5. A material stacker comprising a housing having a substantially open top through which convection air is admitted, said housing having a side wall with a substantially tangential discharge opening, a motor-driven impeller rotatable in the housing in a direction and at a speed to discharge material and convection air through said opening, said impeller comprising a disk substantially corresponding in diameter to the housing within said wall and having blades secured marginally to the disk and disposed approximately radially thereon, portions of the impeller blades being compoundly curved, being not only curved in vertical cross section to pick up material from the face of the disk as such material is caused to rotate with the blades, but also having scooped ends curving forwardly in the direction of impeller rotation and from which such material with convection air is ejected centrifugally from the housing.

6. A stacker according to claim 5 in which the housing has a wall provided with a material-confining flange.

7. A stacker according to claim 6 in which a delivery chute extends downwardly below said opening for material which is not air-borne upon discharge from said opening.

8. A stacker according to claim 6 in which means is provided for introducing material into said housing to pass with the impeller blades beneath said flange, said baffle being disposed between said means and said flange in a position to trap such material and air beneath said flange to be compressed onto the flange and discharged with the material from said opening.

9. A stacker according to claim 8 in which said housing is tiltably and adjustably supported on a stand provided with means for controlling its position of tilt.

References Cited

UNITED STATES PATENTS

| | | | |
|---|---|---|---|
| 596,307 | 12/1897 | Quinn | 302—8 |
| 1,011,259 | 12/1911 | Smith | 302—37 |
| 1,338,045 | 4/1920 | Smith | 302—8 |
| 2,272,908 | 4/1942 | Dick | 198—128 |
| 3,355,005 | 11/1967 | Craggs | 198—128 |

ANDRES H. NIELSEN, Primary Examiner

U.S. Cl. X.R.

214—17; 302—8; 198—128